United States Patent
Grondal et al.

[19]

[11] Patent Number: 6,026,602
[45] Date of Patent: *Feb. 22, 2000

[54] APPARATUS AND METHOD OF INDIRECTLY ILLUMINATING A SIGN

[75] Inventors: Daniel J. Grondal, Bethel; Robert M. Johnstone, Fairfield, both of Conn.

[73] Assignee: Prolume, Inc., Monroe, Conn.

[ * ] Notice: This patent is subject to a terminal disclaimer.

[21] Appl. No.: 08/968,336

[22] Filed: Nov. 12, 1997

Related U.S. Application Data

[60] Continuation of application No. 08/693,871, Aug. 5, 1996, abandoned, which is a division of application No. 08/483,257, Jun. 7, 1995, Pat. No. 5,542,201, which is a continuation of application No. 08/102,285, Aug. 5, 1997, Pat. No. 5,428,912.

[51] Int. Cl.$^7$ .................................................. G09F 13/04
[52] U.S. Cl. ................................. 40/570; 40/544; 40/582; 362/800
[58] Field of Search .......................... 40/570, 544, 582, 40/572; 362/800

[56] References Cited

U.S. PATENT DOCUMENTS

| | | | |
|---|---|---|---|
| 1,524,446 | 1/1925 | Meacher | 40/572 |
| 1,944,276 | 1/1934 | Schepmoes . | |
| 3,309,806 | 3/1967 | Gallagher . | |
| 3,310,670 | 3/1967 | Sheppard . | |
| 3,324,290 | 6/1967 | Lasker | 40/570 |
| 3,402,494 | 9/1968 | Gray . | |
| 3,957,351 | 5/1976 | Stockwell . | |
| 4,768,300 | 9/1988 | Rutilli . | |
| 5,018,290 | 5/1991 | Kozek et al. | 40/570 |
| 5,105,568 | 4/1992 | Branning | 40/570 |
| 5,136,483 | 8/1992 | Schoniger | 362/800 |
| 5,151,679 | 9/1992 | Dimmick | 362/800 |
| 5,299,109 | 3/1994 | Grondal | 40/570 |
| 5,365,411 | 11/1994 | Rycroft et al. | 40/570 |
| 5,388,357 | 2/1995 | Malita | 40/570 |
| 5,398,170 | 3/1995 | Lee | 40/572 |
| 5,410,453 | 4/1995 | Ruskouski | 362/20 |
| 5,416,679 | 5/1995 | Ruskouski et al. | 362/240 |
| 5,428,912 | 7/1995 | Grondal et al. | 40/570 |
| 5,459,955 | 10/1995 | Ruskouski et al. | 40/570 |
| 5,469,347 | 11/1995 | Dove et al. | 362/800 |
| 5,539,623 | 7/1996 | Gurz et al. | 362/800 |
| 5,542,201 | 8/1996 | Grondal et al. | 40/570 |

FOREIGN PATENT DOCUMENTS

| | | | |
|---|---|---|---|
| 1105443 | 12/1955 | France | 10/572 |
| 22990 | 10/1913 | United Kingdom | 40/570 |
| 2168519 | 6/1986 | United Kingdom | 40/570 |

OTHER PUBLICATIONS

Chloride Systems, "Infinity LED Exit Signs", 4 pages, Jan. 1993.

Litebar Technologies, Inc., "What is Litebar?", 4 pages, May 1993.

*Primary Examiner*—Hoang Nguyen
*Attorney, Agent, or Firm*—Cummings & Lockwood

[57] ABSTRACT

An internally illuminated sign having indirect illumination provided by light emitting diodes (LED). A plurality of LED's are mounted on a printed circuit board (PC board) and mounted within the sign. The PC board is offset to a side of the sign housing with the somewhat directional LED light source directed toward a reflector. The reflector is angled to convert the generally narrow directional light source of an LED into a substantially even, diffused and non-uniform light distribution pattern.

18 Claims, 3 Drawing Sheets

6,026,602

APPARATUS AND METHOD OF INDIRECTLY ILLUMINATING A SIGN

This patent application is a continuation of patent application Ser. No. 08/693,871, herewith, filed Aug. 5, 1996, now abandoned, which was a divisional of patent application Ser. No. 08/483,257, filed Jun. 7, 1995, now U.S. Pat. No. 5,542,201, which was a continuation of patent application Ser. No. 08/102,285, filed Aug. 5, 1997, now U.S. Pat. No. 5,428,912.

FIELD OF INVENTION

The present invention relates to illuminated devices and, more particularly, to an LED illuminated sign such as, for example, a so-called exit sign.

BACKGROUND OF INVENTION

Typically, lighted signs such as are utilized for indicating an "exit", or "fire escape" and the like, generally include a transparent or translucent colored lens or cover screen interposed in front of at least one florescent or incandescent bulb. Such devices, however, require relatively expensive and frequent maintenance, i.e., bulb replacement, provide noticeably pinpoint light source and high operation cost.

Some conventionally lighted signs use bulbs to either form the word(s) or are arranged contiguously in alignment with the transparent word portions of the sign. Obviously, the letters of the sign in front of the bulbs appear much brighter than those portions spaced further from the bulb, the result being an inefficient, relatively expensive and esthetically unpleasant illuminated sign. In addition, the burnout of one or more such bulbs is typically noticeable by observers and information distortion may result.

These devices have numerous deficiencies such as being sumptuous in component parts, being cumbersome in design, requiring considerable maintenance, and subject to failure, and are relatively expensive and complex to manufacture.

PRIOR ART STATEMENT

In a number of prior art devices, such as described in U.S. Pat. Nos. 3,402,494 issued Sep. 24, 1968 to Raymond L. Gray; and 3,310,670 issued Mar. 21, 1967 to Ronald W. Sheppard; and 1,944,276 issued to Lindsey Schepmoes; the use of incandescent bulbs within an exit type sign is disclosed.

Another patent reference of interest is U.S. Pat. No. 3,309,806 issued Mar. 21, 1967 to R. S. Gallagher. This prior art "exit" sign used a plurality of light bulbs arranged in rows and columns parallel with a diffusing plate and lens plate. Although this device may present some advantages over the incandescent sign devices noted above, this type sign (design) is flawed in that such bulb arrangements can result in noticeable bulb burnout(s) and requires relatively numerous bulbs due to the light retarding effect of the diffusing plate.

Other prior art patents of interest include: U.S. Pat. Nos. 5,018,290 issued May 28, 1991 to Edward P. Kozek and Charles R. Ruskouski; 3,957,351 issued May 18, 1976 to Glade M. Stockwell; and 4,768,300 issued Sep. 6, 1988 to Renzo N. Rutili.

The above noted patents are mentioned as being representative of the prior art and other pertinent references may exist. None of these patents are deemed to affect the patentability of the present claimed invention.

In contrast to the prior art "exit" type signs typically used in buildings to meet local fire and building codes, the present invention provides a relatively low cost sign which uses low energy consuming LED's mounted on printed circuit board and located at one or more sides of the housing to provide a source of relatively directional light which is then converted or reflected to simulate a diffused light source behind the transparent or translucent word portions of the sign.

SUMMARY OF THE INVENTION

An illuminated sign construction comprising: a housing having an open side wall, a sign cover plate having indicia and/or words demarcated/defined by translucent sections of plastic or glass or the like, a plurality of light emitting diodes mounted within said housing in back-of or posterior to the non-translucent or opaque portions of the sign cover plate, and a reflective surface for reflecting and diffusing the somewhat directional light being emitted by the LED's into a relatively diffused field of light illumination through the sign indicia to thereby present substantially uniformly illuminated sign indicia and/or words.

OBJECTIVES

Accordingly, it is an object of the present invention to provide a new and improved illuminated type sign.

Another object of the present innovation is to provide a new and improved "exit" type sign.

Another object of the present inventions is to provide a new and improved illuminated directional sign.

Another object of the present innovation is to provide a sign apparatus that provides a substantially uniform field of illumination from a plurality of LED's offset within the sign apparatus.

Another object of the present invention is to provide an illuminated type sign being relatively less expensive to manufacture.

Another object of the present invention is to provide a sign apparatus which is relatively less complex to manufacture.

Another object of the present invention is to provide a relatively light weight, durable, less energy consumptive and long lasting "exit" type sign for whatever sign symbols are desired.

Another object of the present invention is to provide an LED illuminated sign adapted to enable signs of different designations interchangeable without rearrangement or dislocation of the mounted LED light source.

It is yet another object of the invention to provide a sign having a reflector and diffuser means for substantially converting the virtual unidirectional light emitted from LED's into a source of substantially diffused light radiated from the sign indicia.

The invention possesses other objects and features and advantages, which will be set forth in the detailed description of the preferred embodiments of the invention. It is to be understood, however, that variations of the illustrated embodiments may be achieved which are within the intended scope of claimed invention.

BRIEF DESCRIPTION OF THE DRAWINGS

Throughout the drawings, like reference numerals refer to like parts.

DESCRIPTION OF THE PREFERRED EMBODIMENTS

Figure 1:
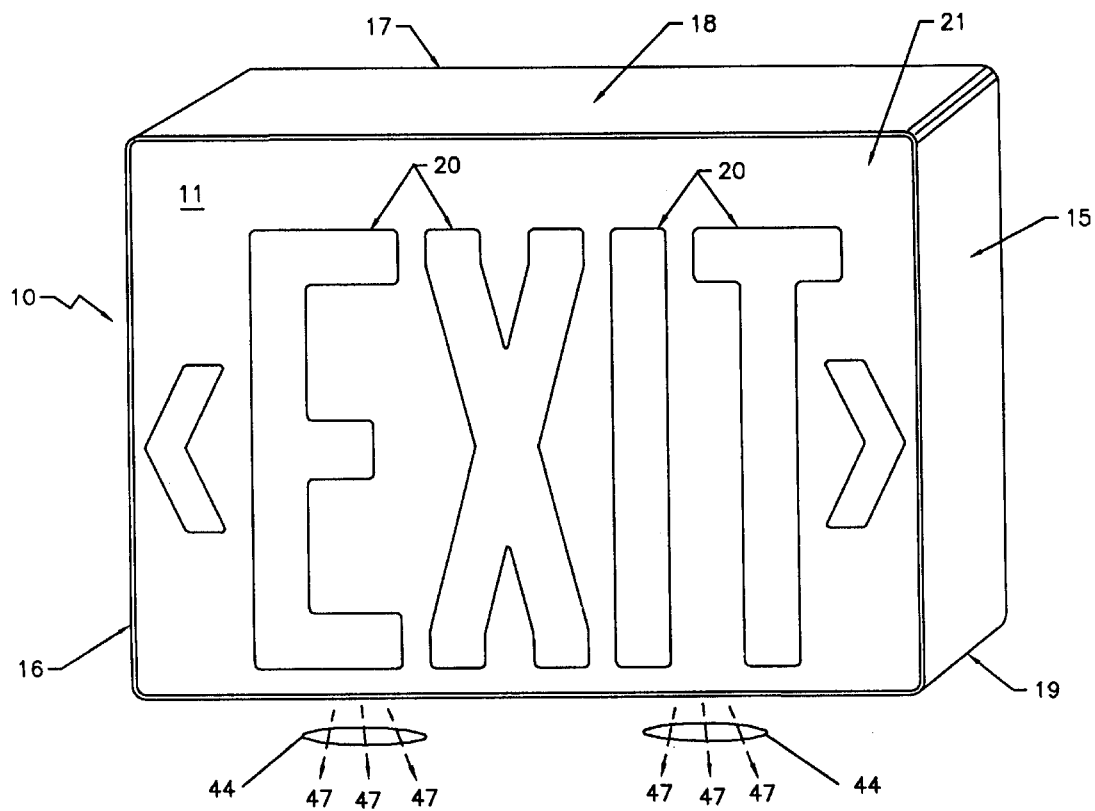
FIG. 1 is a perspective view of a sign embodying the present invention.
Figure 2:
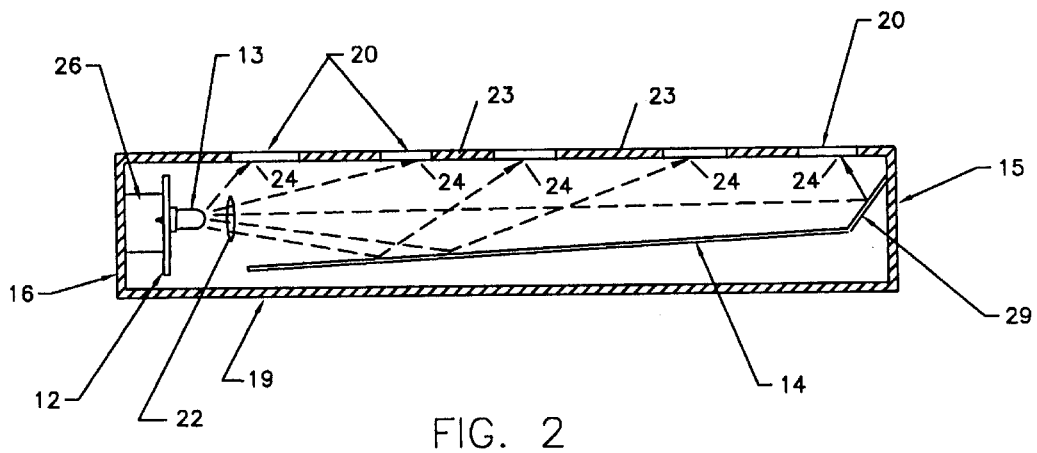
FIG. 2 is a cross sectional view of the sign illustrated in FIG. 1 showing the offset or off-staged LED printed circuit board and reflector assembly in accordance with the invention.

Referring to the drawings in which like numerals indicate like-parts, particularly FIGS. 1 and 2 there is shown an "exit" type sign constructed in accordance with the invention to have a simple assembly comprising a housing 10, a sign plate 11, a printed circuit board 12 (PC board) having a plurality of light emitting diode (LED) lights 13, and a reflector plate 14.

In general, the housing 10 has a pair of spaced side walls 15, 16, a back wall 17, a top wall member 18, and a bottom wall member 19. The housing 10 may be formed of plastic, metal or other suitable material and being conventionally dimensioned for the selected use such as an "exit" sign used in buildings according to local code. Basically, such signs have a rectangular or box shape of a size to accommodate a display panel or cover plate 11 of desired dimensions. The housing 10, including the sides 15, 16, 17, 18, and 19 and the front side formed by display panel 11, forms an enclosure as shown in FIG. 2. It will be appreciated that the structure as described thus far can be utilized to provide an illuminated display in a generally conventional manner whereby light passes though the translucent legend 20 and is blocked by the opaque or non-transparent portions 21 of cover plate 11, to illuminate and define, for example, the word "EXIT". The cover plate 11 may be formed of a flat sheet of translucent plastic and having a rectangular shape and dimensioned for being affixed to the housing 10 over the front open wall portion defined by walls 15, 16, 18, and 19.

In accordance with the present invention, a printed circuit board 12 with a plurality of light emitting diodes 13 mounted thereon is affixed/mounted in conventional manner to a side wall member 16 of housing 17. The PC board may have an obtuse or acute angulation relative to the longitudinal axis of the enclosure. And a reflector member or plate 14 is mounted within housing 10 for reflecting the light output 22 from the LED's 13 unto the bottom surface 23 of cover plate 20 and through the transparent sections 24 of the indicia/legend 20.

The LED's 13 may be mounted onto the PC board 12 and electrically actuated/energized in conventional manner. Accordingly, an electrical diagram or schematic and LED bulb mounting fixture details are omitted to avoid prolixity. Basically speaking, however, the PC board 12 may be affixed to side wall member 16 of housing 110 by conventional nuts and bolts 26.

As is generally recognized, LED's 13 when energized produce a relatively narrow band 22 of somewhat directional light beams 25. It is this narrow band of directional light characteristic which prior to the present invention caused sign manufacturers to avoid their use in such signs.

Figure 7:
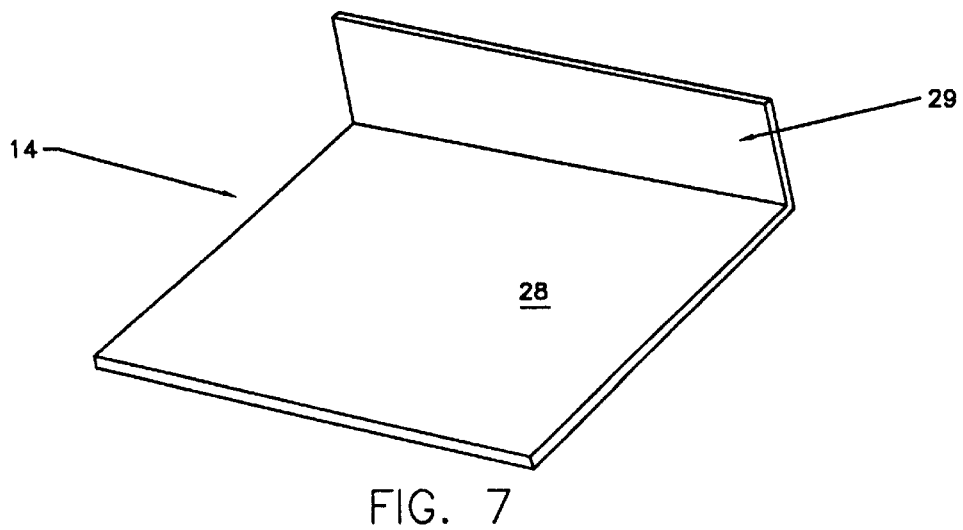
FIG. 7 is a perspective view of a reflector member having a specular or knurled reflective surface in accordance with the invention.

An important feature of the present invention is the provision of a reflector 14 mounted within housing 10. Reflector 14 may be formed of a polished metal or other suitable material to have a reflective surface 28. The reflective surface 28 may be smooth or specular or knurled or other suitable surface finish so as to reflect and diffuse the beams 22 of light 25 within housing 10 and, thereby, provide a diffused and uniform illumination through the transparent legend sections 20. In this manner, the benefits of a low energy consuming LED light source is converted into substantial uniformly diffused/scattered light within the "EXIT" type sign. The reflector plate member 14 may be dimensioned to accommodate the size of the sign legend 20 so as to efficiently utilize the available beams of light 25 which may be substantially directed onto the reflector plate within housing 10. Reflector 14, as shown in FIGS. 2 and 7, may comprise a rectangular flat sheet of polished metal having an upturned or bent section 29 angled to reflect light rays upwardly onto the cover plate 11.

Figure 3:
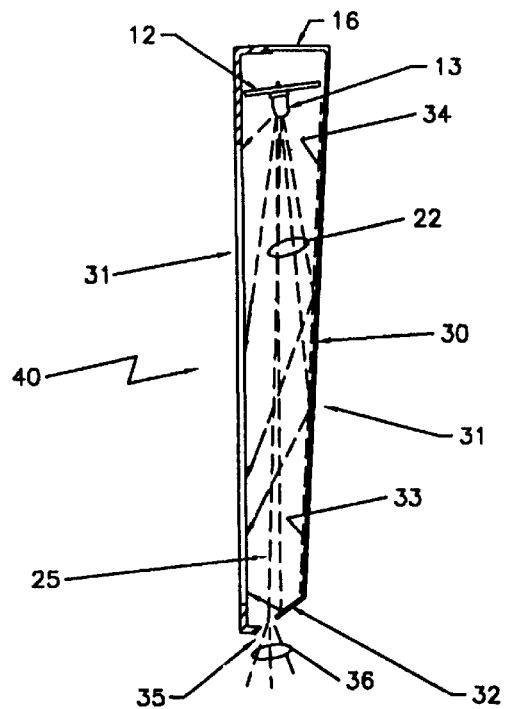
FIG. 3 is a cross-sectional view of an alternative embodiment of a single sided sign in accordance with the invention.

Referring now to FIG. 3, a first alternative embodiment of the sign and reflector shown in FIG. 1 are illustrated. All other components and operations remain basically the same. The rear or bottom wall 30 of housing 31 comprises a square or rectangular-shaped wall member 30 having a bent or inclined end portion 32 contoured for reflecting light rays 25 upwardly toward the legend cover plate 11. The inside of the bottom wall 30 is treated to yield a high reflectance, specular, or polished-knurled finished reflector 33. The specular or knurled reflective surface is illustrated by a broken line 34. Since the technology for forming a reflective, specular or knurled surface is within the prior art, a more detailed discussion of the method of forming such a surface 33, 34 on the housing bottom wall 30 is omitted to avoid prolixity. The end section 32 of the reflector back panel 30 may contain one or more holes 35 to enable light rays 36 to radiate without said housing end section 32 (see FIG. 3) and/or at the bottom 16 (see FIG. 1) of the sign 10. In this manner partial lighting, i.e., down light through the holes 35 in the housing, may be provided in a relatively simple, inexpensive and efficient manner as compared to the prior art.

Figure 4:
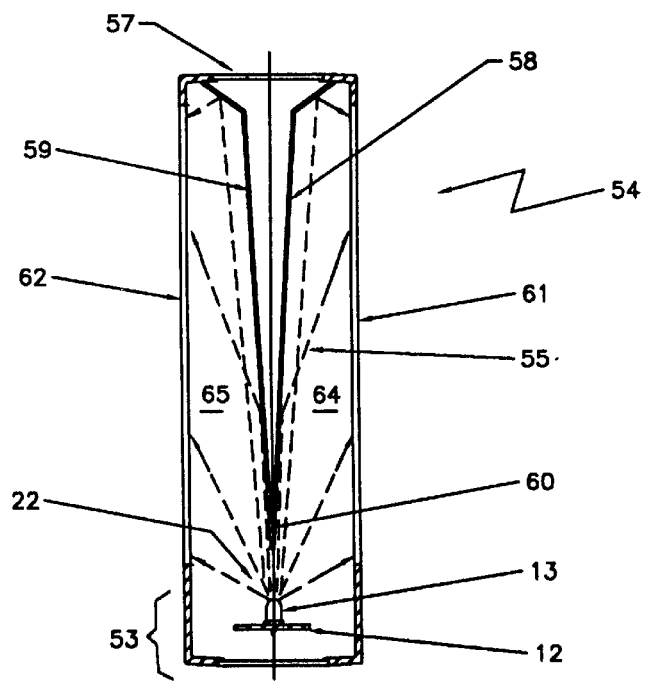
FIG. 4 is a cross-sectional view of an alternative embodiment of the invention illustrating a double-sided type sign.

Referring to FIG. 4, a second contemplated alternative embodiment of the "EXIT" type sign is depicted. The PC board 12 and row of LED lights 13 are mounted by conventional means (not shown) at the bottom end 53 of the double-sided sign enclosure or housing 54. The PC board 12 and LED row of lights 13 are oriented relative to housing 54 such that a substantial portion of the light rays 55 and 56 radiate upwardly toward the top end 57 of housing 54. A pair of oppositely facing reflector plates 58, 59 are mounted above and aligned with the row of LED lights 13. The bottom ends 60 of reflector plates 58, 59 are abutted together to form a relatively thin edge for splitting or partitioning or separating the bundle of light rays 22 emitted from the LED lights 13. Reflector 58 is tilted outwardly toward face plate or legend plate 61. Reflector 59 is tilted outwardly toward face (legend) plate 62. Each reflector 58, 59, has a mirror like surface or specular reflective surface to effect light diffusing and dispersing therewithin. In the embodiment illustrated in FIG. 4, the bundle of light rays 22 is divided into substantially two equal and diverging bundles of light rays 55, 56. Each of these diverging bundles of light rays 55, 56 are diffused and reflected by reflectors 58, 59 respectively. In this manner the reflected light rays 55, 56 generate a substantially uniform illumination within each sign side 64, 65, respectively. Thus, the sign legend or characters or letters (not shown) are substantially uniformly illuminated. It should be recognized that the reflectors or baffles 14, 58, 59 are somewhat rectangularly shaped and slightly smaller in size than the housing.

Figure 5:
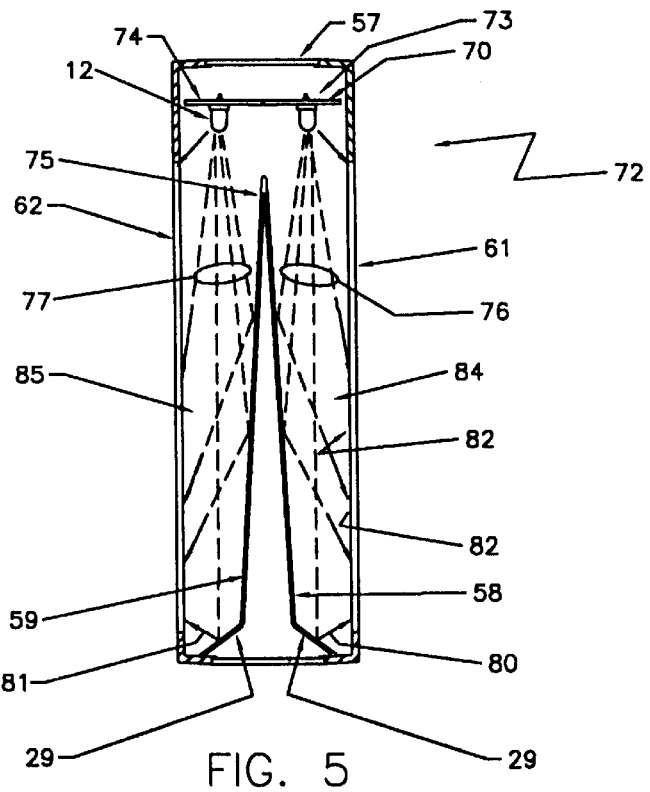
FIG. 5 is a cross-sectional view of an alternative embodiment of the invention depicting a double-sided sign.
Figure 6:
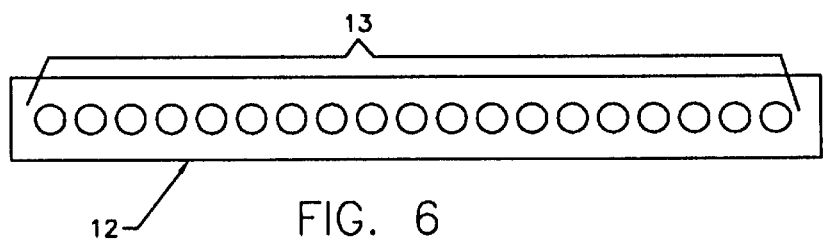
FIG. 6 is a front plan view illustrating a possible arrangement for mounting the LED's in accordance with the invention.

Referring now to FIG. 5, another alternative embodiment is illustrated. This embodiment features a double-sided housing 54 having oppositely facing sign plates or legend panel 61, 62. An enlarged PC board 70 is mounted at the top end 57 of sign 72. Two spaced apart rows 73, 74, each containing a plurality of LED lights are mounted on PC board 70. The LED lights are directed downwardly within housing 54 by conventional means (not shown). The reflectors 58, 59 are joined or abutted together along their top edges 75 and diverge outwardly. In this manner, light rays 76 are diffused and reflected off reflector 58 to effect a substantially uniform illumination on legend plate 61. Light rays 77 are diffused and reflected off reflector 59 to effect a substantially uniform illumination on legend plate 62. Thus, reflector plates 58, 59 generally extend downwardly the full length of display sign 72 and each has a bent end section 29 at its bottom. Bent end sections 29 are contoured to reflect emitted light rays 80, 81, into legend plates 61,62, respectively. The internal or back surfaces of the opaque area of legend plates 61, 62, respectively, are coated 82, 83 with a reflective coating to reflect the light rays striking the opaque regions to, thereby, enhance the uniformity of illumination within each separate chamber or side display panel 84, 85, respectively.

It should be recognized that the prior art LED "EXIT" signs use large printed circuit boards arranged parallel to the legend face plate and have many light bulbs which emit light rays directly unto the legend face plate. Such prior art signs have presented numerous disadvantages, such as, for example:

High cost for materials

Relatively high Energy Consumption

Additional components for down-lighting

Relatively uneven illumination and spotted legend light effects

Defective bulbs resulting in noticeable sign defects

IN TOTAL CONTRAST to the prior art "EXIT" type signs, the present invention provides a relatively small PC board module with LED's oriented to provide indirect illumination of the sign legends. The placement, size, orientation and other features of the present inventive sign provide the following benefits and improvements over the prior art signs:

1. Illumination board perpendicular to the face provides indirect even illumination to the legend (no hot spots).
2. A minimal amount of LED's are required, and therefore a minimum surface area of PC board material is required.
3. Down light (light through bottom of enclosure) is accomplished automatically and without the use of costly additional components.
4. With better performance and less components, a savings is also achieved in energy (power) consumption.
5. Because the illumination module is small, the enclosure can be smaller and therefore less costly to manufacture.

While there has been shown what is considered to be the preferred embodiment and several alternative embodiments of the invention, it is desired to secure in the appended claims all modifications as fall within the true spirit and scope of the invention.

What is claimed is:

1. A method of illuminating a sign assembly having a housing including a plurality of sides, and a display located on a side of the housing and including indicia defined by at least one translucent portion to permit the passage of light therethrough for viewing the indicia, the method comprising the steps of:

mounting a substrate having a plurality of solid-state lamps thereon to a wall on one side of the housing located adjacent to the side of the display, and orienting the substrate generally perpendicular to the display;

providing at least one first approximately planar reflective surface within the housing spaced apart from and facing the display;

providing at least one second approximately planar reflective surface within the housing spaced apart from and facing the plurality of solid-state lamps and thereby forming a cavity between the first and second reflective surfaces and display; and transmitting light from the solid-state lamps along an unobstructed path into the cavity and in turn reflecting the light within the cavity off of the at least one first and at least one second reflective surfaces to illuminate the cavity and thereby illuminate the display.

2. A method as defined in claim 1, wherein the housing defines a rectangular enclosure, and comprising the steps of mounting the substrate on only one side of the rectangular enclosure, transmitting light from the solid-state lamps on said substrate along an unobstructed path into the cavity, reflecting the light within the cavity off the at least one first and second reflective surfaces, and in turn illuminating the cavity to thereby illuminate the display.

3. A method as defined in claim 1, comprising the step of mounting a substrate in the form of a printed circuit board having a plurality of light emitting diodes thereon to the wall of the housing and generally perpendicular to the display, and transmitting the light from the light-emitting diodes along an unobstructed path into the cavity, reflecting the light off the at least one first and second reflective surfaces and in turn illuminating the cavity and display.

4. A method as defined in claim 1, comprising the step of providing the at least one first reflective surface and the at least one second reflective surface each on a respective side of the housing forming the cavity.

5. A method of illuminating a sign assembly having a housing including a plurality of sides forming a rectangular enclosure, and a display located on at least one side of the housing and including indicia defined by at least one translucent portion to permit the passage of light therethrough for viewing the indicia, the method comprising the steps of:

providing a plurality of light emitting diodes on a circuit board;

mounting the diodes on only one side of the enclosure with the circuit board located adjacent to the side of the display and oriented approximately perpendicular to the display;

providing at least one first non-curvilinear reflective surface within the housing spaced apart from and facing the display;

providing at least one second non-curvilinear reflective surface within the housing spaced apart from and facing the light emitting diodes and forming a cavity between the at least one first and second reflective surfaces and display;

transmitting light from the diodes along an unobstructed path into the cavity; and reflecting the light within the cavity off the at least one first reflective surface and at least one second reflective surface and thereby illuminating the cavity and display.

6. A method as defined in claim 5, comprising the step of providing the at least one first reflective surface on a wall of the housing forming the cavity and facing the display, and the at least one second reflective surface on a wall of the housing forming the cavity and facing the light emitting diodes.

7. A method as defined in claim 5, further comprising the step of providing at least one third reflective surface on an interior side of the display facing the at least one first non-curvilinear reflective surface, and further reflecting the light within the cavity off the at least one third reflective surface to thereby illuminate the cavity and display.

8. An illuminated sign assembly, comprising:
a housing including a plurality of sides, and a display located on a side of the housing, the display including indicia defined by at least one translucent portion to permit the passage of light therethrough for viewing the indicia;
a circuit board mounted on a side of the housing adjoining the side of the display, the circuit board being oriented approximately perpendicular to the display;
a plurality of light emitting diodes mounted on the circuit board emitting light therefrom within the housing;
at least one first approximately planar reflective surface within the housing spaced apart from and facing the display;
at least one second approximately planar reflective surface within the housing spaced apart from and facing the plurality of light emitting diodes, wherein the at least one first and at least one second approximately planar reflective surfaces and the display form a cavity defining an unobstructed path receiving light transmitted by the diodes, and the light within the cavity is reflected off the approximately planar reflective surfaces illuminating the cavity and in turn illuminating the display.

9. An illuminated sign assembly as defined in claim 8, wherein the at least one first approximately planar reflective surface and the at least one second approximately planar reflective surface are each formed by a reflector member mounted within the housing.

10. An illuminated sign assembly as defined in claim 9, wherein the reflector member defines a first approximately planar portion forming the first reflective surface, and a second approximately planar portion oriented at an angle of less than 180° relative to the first portion and forming the second reflective surface.

11. An illuminated sign assembly as defined in claim 8, wherein the at least one first approximately planar reflective surface is formed by a wall defining a first side of the housing, and the at least one second approximately planar reflective surface is formed by a wall defining a second side of the housing.

12. An illuminated sign assembly, comprising:
a housing including a plurality of sides, and a display located on a side of the housing, the display including indicia defined by at least one translucent portion to permit the passage of light therethrough for viewing the indicia;
a plurality of light emitting diodes;
means for mounting the plurality of light emitting diodes on a side of the housing adjoining the side of the display, the means for mounting being oriented approximately perpendicular to the display; and
means defining a cavity forming an unobstructed path for receiving the light emitted from the plurality of diodes, and for reflecting the light from the diodes into the cavity to thereby illuminate the cavity and the display, said means including at least one first non-curvilinear reflective surface within the housing spaced apart from and facing the display, and at least one second non-curvilinear reflective surface within the housing spaced apart from and facing the light emitting diodes, wherein the at least one first and at least one second non-curvilinear reflective surfaces and the display form the cavity defining the unobstructed path receiving light transmitted by the diodes, and the light within the cavity is reflected off the non-curvilinear reflective surfaces illuminating the cavity and in turn illuminating the display.

13. An illuminated sign assembly as defined in claim 12, wherein the means for mounting includes a circuit board.

14. An illuminated sign assembly as defined in claim 12, wherein the at least one first non-curvilinear reflective surface is formed by a first side of the housing, and the at least one second non-curvilinear reflective surface is formed by a second side of the housing.

15. An illuminated sign assembly as defined in claim 12, wherein the at least one first non-curvilinear reflective surface and the at least one second non-curvilinear reflective surface are each formed by a reflector member mounted within the housing.

16. An illuminated sign assembly as defined in claim 8, wherein the at least one first approximately planar reflective surface is formed by a panel facing the display, and extends across approximately an entire side of the panel facing the display.

17. An illuminated sign assembly as defined in claim 8, wherein the at least one second approximately planar reflective surface is formed by a panel facing the plurality of light emitting diodes, and extends across approximately an entire side of the panel facing the diodes.

18. An illuminated sign assembly as defined in claim 8, wherein the at least one second approximately planar reflective surface extends substantially entirely between the at least one first approximately planar reflective surface and the display.

* * * * *